United States Patent
Son et al.

(10) Patent No.: US 8,792,790 B2
(45) Date of Patent: *Jul. 29, 2014

(54) APPARATUS AND METHOD FOR SUPPORTING MOBILITY OF A MOBILE TERMINAL THAT PERFORMS VISIBLE LIGHT COMMUNICATION

(75) Inventors: Jae-Seung Son, Suwon-si (KR); Do-Young Kim, Yongin-si (KR); Eun-Tae Won, Seoul (KR); Tae-Han Bae, Seongnam-si (KR); Young-Kwon Cho, Suwon-si (KR); Sun-Gi Gu, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 197 days.

This patent is subject to a terminal disclaimer.

(21) Appl. No.: 13/233,736

(22) Filed: Sep. 15, 2011

(65) Prior Publication Data

US 2012/0008959 A1    Jan. 12, 2012

Related U.S. Application Data

(63) Continuation-in-part of application No. 12/886,272, filed on Sep. 20, 2010.

(30) Foreign Application Priority Data

Sep. 19, 2009 (KR) .................. 10-2009-0088783
Sep. 15, 2010 (KR) .................. 10-2010-0090812

(51) Int. Cl.
*H04B 10/00* (2013.01)
*H04B 10/116* (2013.01)
*H04B 10/114* (2013.01)

(52) U.S. Cl.
CPC .......... *H04B 10/116* (2013.01); *H04B 10/1149* (2013.01)
USPC .......................................... 398/172; 398/128

(58) Field of Classification Search
USPC .............................. 398/67, 72, 127, 128, 172
See application file for complete search history.

(56) References Cited

U.S. PATENT DOCUMENTS

| 7,969,297 B2 * | 6/2011 | Haartsen et al. ............... 340/531 |
| 2005/0181834 A1 | 8/2005 | Chen et al. |
| 2006/0133290 A1 | 6/2006 | Lindoff et al. |

(Continued)

FOREIGN PATENT DOCUMENTS

| CN | 101076082 | 11/2007 |
| JP | 02-002729 | 1/1990 |

(Continued)

*Primary Examiner* — Dalzid Singh
(74) *Attorney, Agent, or Firm* — The Farrell Law Firm, P.C.

(57) ABSTRACT

A method and apparatus for supporting mobility of a mobile terminal in a Visible Light Communication (VLC) system. The method includes searching, by the VLC device, for a first mobile terminal in a plurality of cells; locating the first mobile terminal in a first cell among the plurality of cells; exchanging data with the first mobile using a light source of the first cell; determining whether a response signal corresponding to data reception is received from the first mobile terminal in the first cell; searching for the first mobile terminal in a neighboring cell of the first cell, if the response signal is not received; and determining the neighboring cell as a second cell for visible light activation, if the first mobile terminal is located in the neighboring cell.

41 Claims, 8 Drawing Sheets

(56) References Cited

U.S. PATENT DOCUMENTS

| | | |
|---|---|---|
| 2007/0269203 A1 | 11/2007 | Awazu |
| 2008/0281515 A1 | 11/2008 | Ann et al. |
| 2009/0022112 A1 | 1/2009 | Shin et al. |
| 2009/0073952 A1 | 3/2009 | Shin et al. |
| 2009/0171571 A1 | 7/2009 | Son et al. |
| 2009/0297166 A1* | 12/2009 | Nakagawa et al. ........... 398/172 |
| 2009/0310971 A1 | 12/2009 | Kim et al. |
| 2011/0026917 A1 | 2/2011 | Li et al. |
| 2011/0044218 A1 | 2/2011 | Kaur et al. |
| 2011/0069951 A1* | 3/2011 | Son et al. ........................ 398/17 |
| 2012/0189313 A1* | 7/2012 | Pederson et al. .............. 398/115 |

FOREIGN PATENT DOCUMENTS

| | | |
|---|---|---|
| JP | 10-229368 | 8/1998 |
| JP | 2005-206620 | 8/2005 |
| JP | 2005-236667 | 9/2005 |
| JP | 2009-053118 | 3/2009 |
| JP | 2009-110818 | 5/2009 |
| KR | 1020080022298 | 3/2008 |
| KR | 1020080104663 | 12/2008 |
| KR | 1020090009484 | 1/2009 |
| KR | 1020090027942 | 3/2009 |

* cited by examiner

APPARATUS AND METHOD FOR SUPPORTING MOBILITY OF A MOBILE TERMINAL THAT PERFORMS VISIBLE LIGHT COMMUNICATION

PRIORITY

This application is a Continuation-in-Part of U.S. Ser. No. 12/886,272, which was filed in the U.S. Patent and Trademark Office on Sep. 20, 2010, and claims priority under 35 U.S.C. §119(a) to applications that were filed in the Korean Intellectual Property Office on Sep. 19, 2009 and Sep. 15, 2010, which were assigned Serial Nos. 10-2009-0088783 and 10-2010-0090812, respectively, the entire disclosure of each of which is hereby incorporated by reference.

BACKGROUND OF THE INVENTION

1. Field of the Invention

The present invention relates generally to a Visible Light Communication (VLC) system, and more particularly, to an apparatus and method for supporting mobility of a mobile terminal that performs VLC with a VLC device included in the VLC system.

2. Description of the Related Art

As the name implies, VLC refers to wireless communication technology for communication using light in a visible light wavelength band. VLC is an alternative to a radio frequency-based communication scheme, and has being actively studied with the increased usage of Light Emitting Diodes (LEDs).

Figure 1:
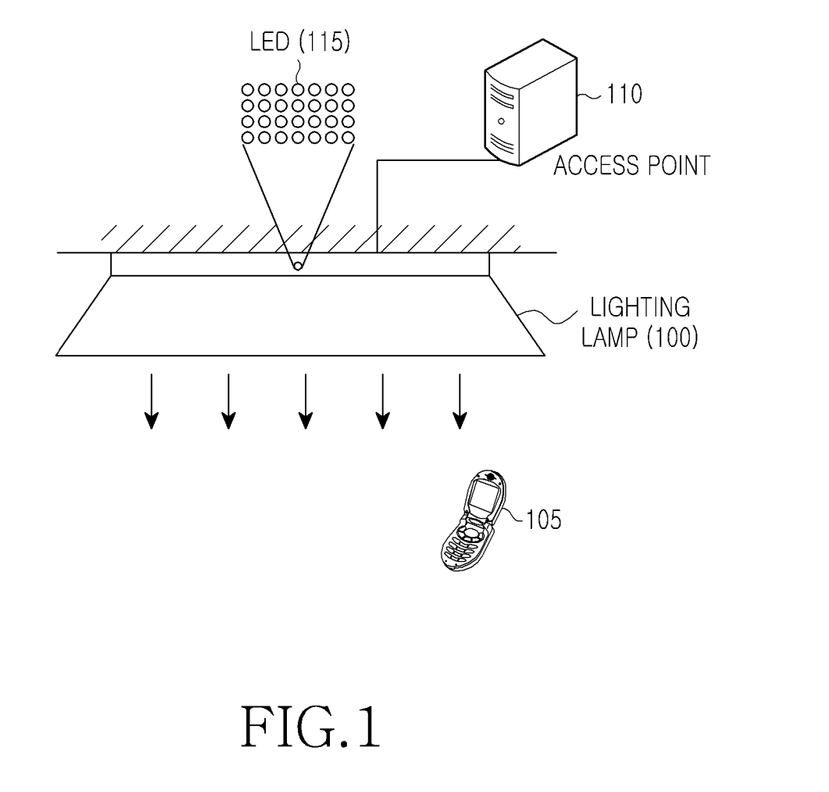
FIG. 1 illustrates a conventional Visible Light Communication (VLC) system.

FIG. 1 illustrates a conventional Visible Light Communication (VLC) system.

Referring to FIG. 1, the conventional VLC system includes a lighting lamp 100 and a mobile terminal 105. The lighting lamp 100 includes at least one LED 115 or Laser Diode (LD) whose color and illumination intensity can be controlled, such that the lighting lamp 100 provides a lighting function and transmits data received from an Access Point (AP) 110 by using visible light. The mobile terminal 105 includes a VLC transceiver (not shown) to perform data transmission and reception with the lighting lamp 100. The AP 110 is connected with the lighting lamp 100 in order to provide a data service to a user via the lighting lamp 100. A frequency band used in the lighting lamp 100 allows high-speed data transmission. A reception side, i.e., the mobile terminal 105, processes the visible light using, for example, a Photo Diode (PD), thereby performing VLC.

In the conventional VLC system, as illustrated in FIG. 1, only physical mobility is considered. More specifically, the mobile terminal 105 performs VLC under the single lighting lamp 100, so that the VLC is achieved only within a region covered by the lighting lamp 100.

As such, conventionally, a lighting function and a communication function are provided by using all of the LEDs included in a lighting lamp, which counters an advantage of using an LED, i.e., low power consumption, because data transmission is performed using the communication function, even with an LED that is located in a region where there is no mobile terminal, thus causing unnecessary power consumption.

Accordingly, in an existing VLC system, the same data is transmitted by all of the light sources without considering the mobility of a mobile terminal, thereby causing unnecessary power consumption.

SUMMARY OF THE INVENTION

The present invention has been designed to solve at least the above-mentioned problems occurring in the prior art.

Accordingly, an aspect of the present invention is to provide an apparatus and method for efficiently supporting mobility of a mobile terminal, thereby providing a seamless VLC service.

In accordance with an aspect of the present invention, a method is provided for supporting, by a VLC device, mobility of a mobile terminal that performs VLC with the VLC device. The method includes searching, by the VLC device, for a first mobile terminal in a plurality of cells; locating the first mobile terminal in a first cell among the plurality of cells; exchanging data with the first mobile using a light source of the first cell; determining whether a response signal corresponding to data reception is received from the first mobile terminal in the first cell; searching for the first mobile terminal in a neighboring cell of the first cell, if the response signal is not received; and determining the neighboring cell as a second cell for visible light activation, if the first mobile terminal is located in the neighboring cell.

In accordance with another aspect of the present invention, an apparatus is provided for supporting mobility of a mobile terminal that performs VLC. The apparatus includes a light source manager for managing information about each of a plurality of light sources and determining a cell to be activated for VLC among a plurality of cells, each of the plurality of cells including a predetermined number of the plurality of light sources; a light source controller for providing a VLC function to light sources of the determined cell; and a controller for searching for a first mobile terminal in the plurality of cells, exchanging data with the first mobile using a first cell among the plurality of cells in which the first mobile terminal is found, determining whether a response signal corresponding to data reception is received from the first mobile terminal in the first cell, searching for the first mobile terminal in a neighboring cell of the first cell, if the response signal is not received, and determining the neighboring cell as a second cell for visible light activation, if the first mobile terminal is found in the neighboring cell.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF THE EMBODIMENTS OF THE INVENTION

Hereinafter, various embodiments of the present invention will be described in detail with reference to the accompanying drawings. Throughout the drawings, like reference numerals and symbols refer to like elements. The detailed descriptions of functions and configurations incorporated herein that are well known to those skilled in the art will be omitted to avoid unnecessarily obscuring the present invention.

Although terms defined in a VLC field will be used to describe the present invention, such a standard and designations do not limit the scope of the present invention.

In accordance with an embodiment of the present invention, while exchanging data with a mobile terminal in a cell managed by a VLC system, and if failing to receive a response signal corresponding to data reception from the mobile terminal, the VLC system determines whether an uplink signal has been received in a neighboring cell, and determines a visible light active region, based on the cell location at which a signal indicating normal data reception is received from the mobile terminal. Each cell includes a predetermined number of light sources.

Accordingly, by transmitting data using some of the available light sources of a VLC device in consideration of movement of the mobile terminal, rather than by using all of the available light sources, power consumption is more efficiently managed.

Figure 2:
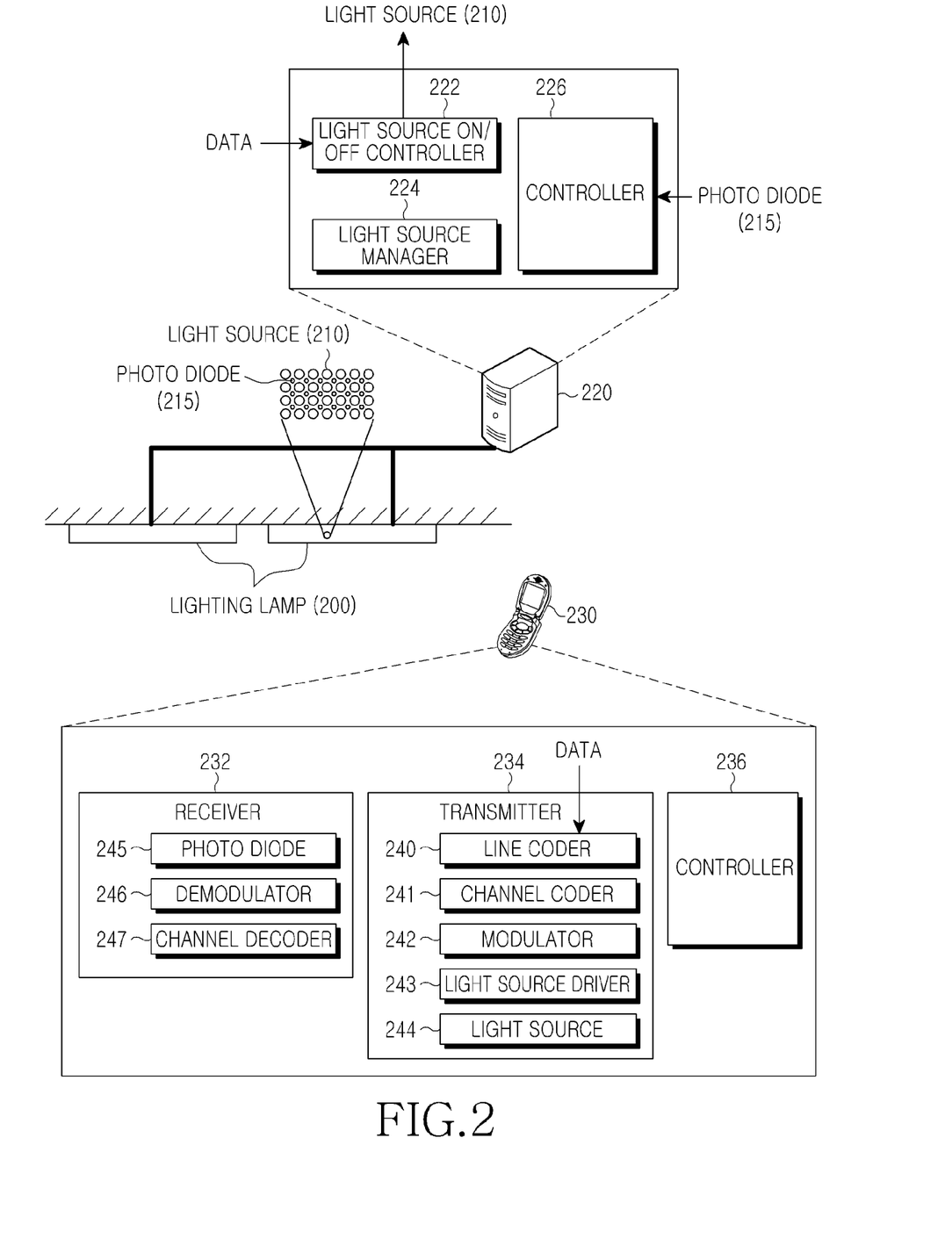
FIG. 2 illustrates a VLC system according to an embodiment of the present invention.

FIG. 2 illustrates a VLC system according to an embodiment of the present invention.

Referring to FIG. 2, the VLC system includes a lighting lamp 200, a VLC device 220 that is connected to each of the lighting lamp 220 and performs VLC with a mobile terminal 230, and the mobile terminal 230.

The lighting lamp 200 includes a plurality of light sources 210 and a Photo Diode (PD) 215 for detecting a signal from the mobile terminal 230. The lighting lamp 200 provides a general lighting function and also serves as a transmitter for transmitting a signal. The light source 210 may be, for example, an LED or a Laser Diode (LD).

An embodiment of the present invention proposes a spatial mobility function for transmitting data using some of the available light sources of the light lamp 200, taking account of mobility of the mobile terminal 230, instead of merely using all of the available light sources. Accordingly, the VLC device 220 according to an embodiment of the present invention is connected with the lighting lamp 200 to manage the light sources 210 of the lighting lamp 200 or several cells (or sectors) of the lighting lamp 200, where each cell includes a predetermined number of light sources. The VLC device 220 may be, for example, an Access Point (AP) for VLC, which is commonly referred to as a coordinator. The VLC device 220 provides a data service to the mobile terminal 230 located in a cell including the light sources 210 of the lighting lamp 200 and having a predetermined number of light sources. As such, by using only a cell necessary for VLC based on movement of the mobile terminal 230, i.e., a cell corresponding to the location of the mobile terminal 230, power consumption can be reduced.

The VLC device 220 includes a light source on/off controller 222, a light source manager 224 for managing the light sources of the lighting lamp 200, and a controller 226 for determining whether the mobile terminal 230 enters a cell managed by the controller 226, recognizing a request for activating a spatial mobility function from the mobile terminal 230 and performing that function.

More specifically, the light source manager 224 has information about cells of lighting lamps managed by the VLC device 220 and information about a user in a corresponding cell, and determines, from the information, in which cell a communication function is to be provided to a light source. The light source manager 224 has information about an IDentification (ID) of each light source and an ID of a cell to manage each light source.

The light source manager 224 determines which cell is to be activated if the mobility of the mobile terminal 230 is supported in cell units, wherein each cell includes a predetermined number of light sources. Alternatively, the light source manager 224 also determines the number of light sources to be activated for VLC, i.e., to be provided with a communication function, among total light sources to support the mobility of the mobile terminal 230.

The light source on/off controller 222 determines in which cell a communication function is to be provided to a light source. Thus, the light source on/off controller 222 transmits transmission data and information about the cell to which the communication function is to be provided to the light source 210, thereby activating signal transmission through the light source 210 of the cell.

The controller 226, upon receiving an uplink signal from a new cell, determines that the mobile terminal 230 has moved, and provides a communication function to a light source of the new cell. More specifically, the controller 226 exchanges data for VLC with the mobile terminal 230 in a visible light active region, which is lit by at least one of a plurality of cells, each of the cells including a predetermined number of light sources. During the data exchange, the controller 226 determines whether an uplink signal corresponding to data reception has been received. Herein, the uplink signal may be an ACKnowledgement (ACK) frame signal, a Color Visibility Dimming (CVD) frame, etc., although a type of the uplink signal is not limited to these examples as long as it can be transmitted from the mobile terminal 230 to the VLC device 220.

The controller 226, upon receiving the uplink signal, sets the visible light active region by the light source manager 224, and determines whether the uplink signal has been received from the mobile terminal 230 in the set visible light active region. If failing to receive the uplink signal, the controller 226 determines whether a signal, e.g., the uplink signal, has been received in a cell other than the set visible light active region, and if the signal has been received in the cell other than the set visible light active region, the controller 226 changes the visible light active region based on the cell location at which the uplink signal was received. The operation of the controller 226 will be described in more detail below with reference to FIG. 3.

The mobile terminal 230 includes a receiver 232 for receiving data via the visible light, a transmitter 234, and a controller 236. The receiver 232 includes a PD 245 for converting a visible light signal input from an external source into an electric signal. The PD 245 is installed between light sources 244. The electric signal from the PD 245 is restored to data by a demodulator 246. The data is restored to an original transmitted signal by a channel decoder 247. Although the transmitter 234 and the receiver 232 are included in the mobile terminal 230 in FIG. 2, they may also be provided in the VLC device 220 located on the ceiling as well as in the mobile terminal 230.

The transmitter 234 includes a line coder 240, a channel coder 241, a modulator 242, a light source driver 243, and a light source 244. Input data is converted by the line coder 240 by using various line coding methods, for example, Non Return to Zero (NRZ), 8B10B, etc. To prevent data loss from occurring in a radio space, the channel coder 241 uses a channel coding scheme. Data modulation is performed by the modulator 242 for data transmission. The modulated data is then input to the light source driver 243, and is converted into light by the light source 244. The light source driver 243 is connected with the light source on/off controller 222 of the VLC device 220 to provide a simple lighting function, if data transmission is not required, and to simultaneously provide a function for transmitting a signal from the modulator 242 and the lighting function, if data transmission is required.

In accordance with an embodiment of the present invention, the VLC device 220, if failing to receive an uplink signal from the mobile terminal 230 that enters a cell managed by the VLC device 220, determines whether the uplink signal has been received in any of a plurality of neighboring cells. When the uplink signal has been received in at least one of the plurality of neighboring cells, the VLC device 220 identifies the at least one cell and changes a visible light active region based on the at least one cell where the signal was received. Accordingly, a spatial connection method of changing active cells supports the mobility of the mobile terminal, which will be referred to herein as "a spatial mobility function".

Figure 3:
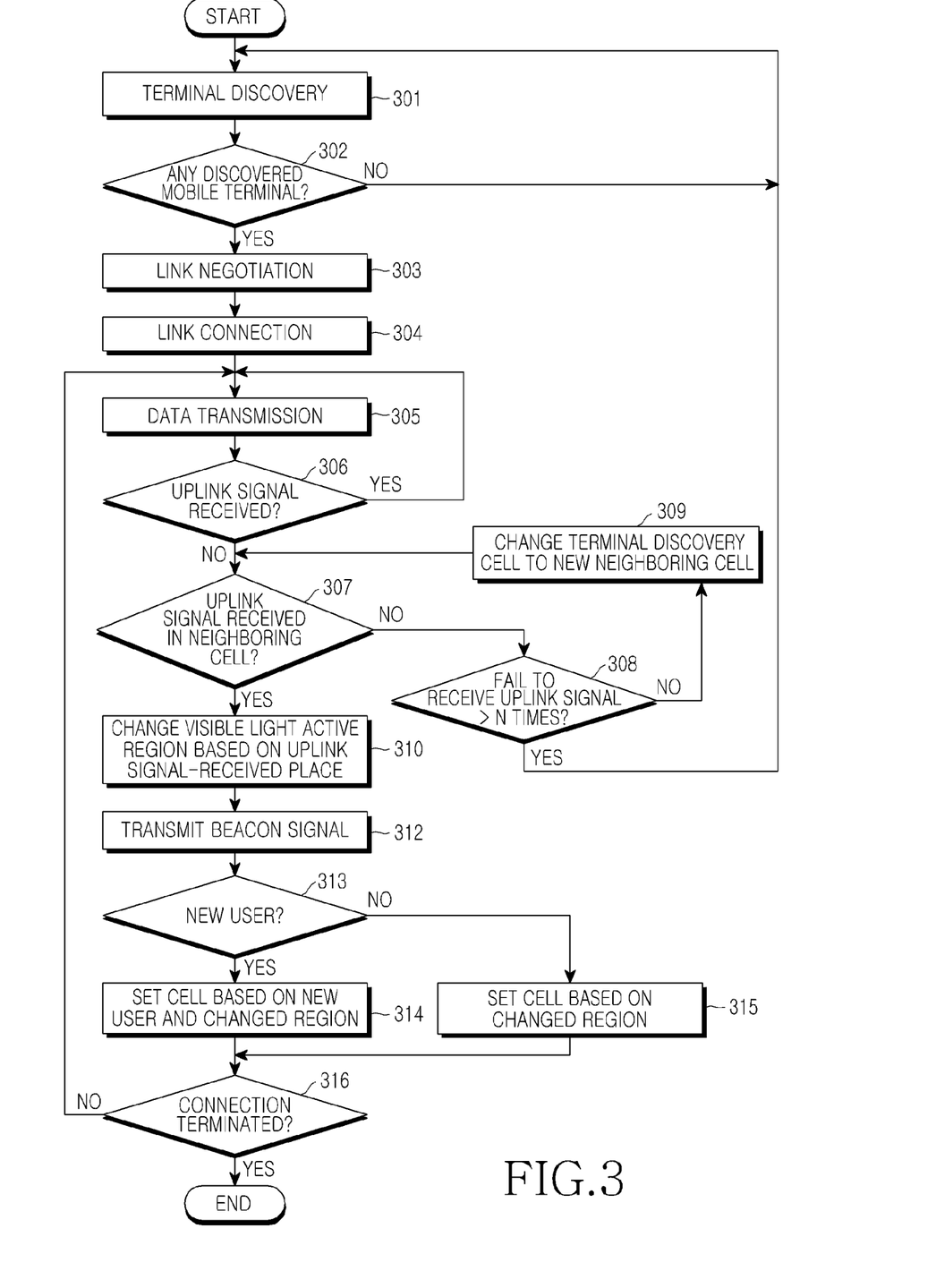
FIG. 3 is a flowchart illustrating a method for supporting mobility of a mobile terminal by changing a sector according to an embodiment of the present invention.

FIG. 3 is a flowchart illustrating a method for supporting mobility of a mobile terminal by changing a cell according to an embodiment of the present invention.

Further, FIGS. 4-7 illustrate light sources being activated based on movement of a mobile terminal according to an embodiment of the present invention.

Figure 4:
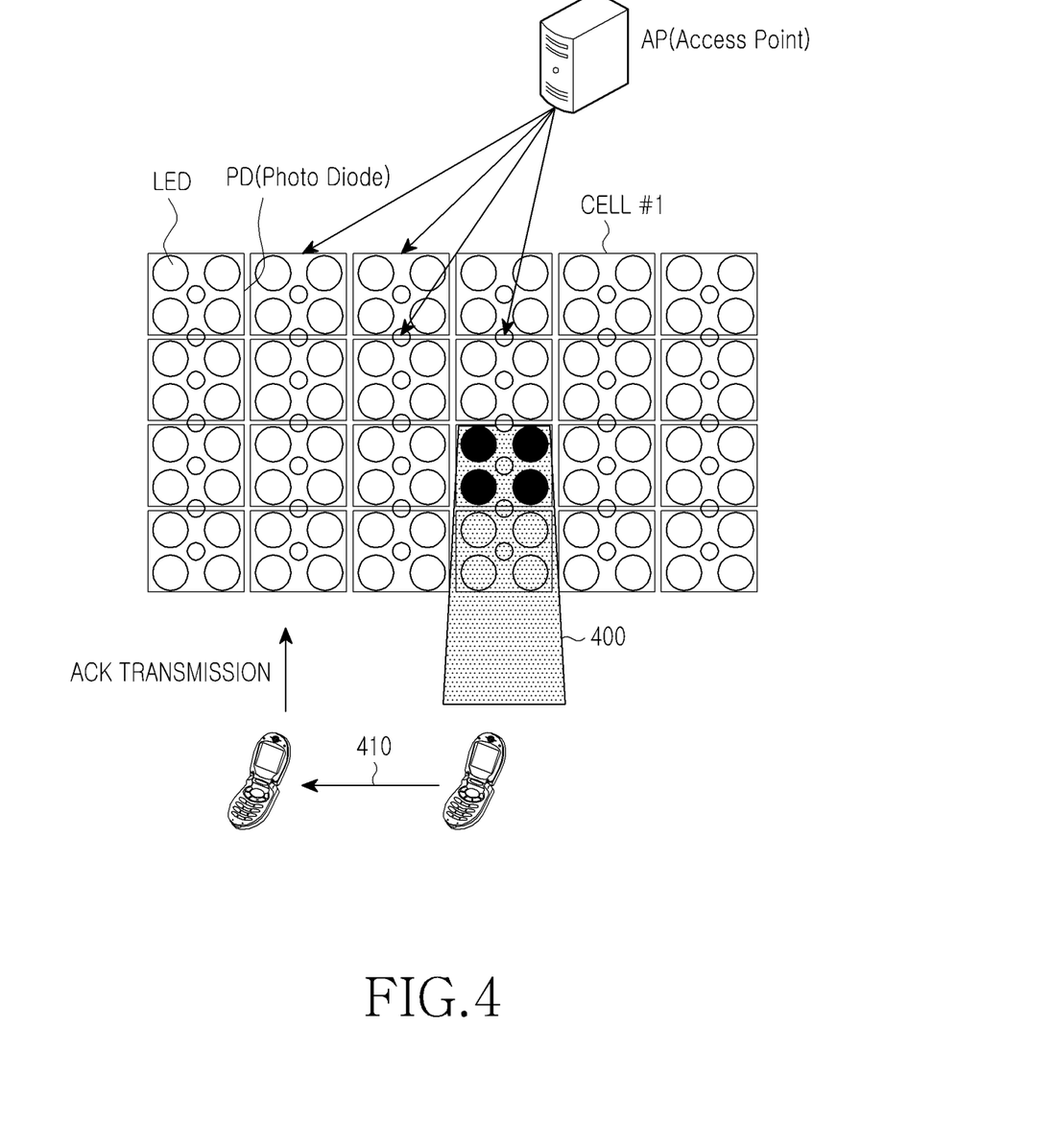
FIGS. 4 through 7 illustrate light sources being activated based on movement of a mobile terminal according to an embodiment of the present invention.

As illustrated in FIG. 4, the VLC device 220 manages light sources forming a lighting lamp, or for example, an electronic display board, in cell units, e.g., SECTOR #1, wherein each cell includes a predetermined number of light sources, e.g., 4 LEDs. The VLC device 220 performs VLC with the mobile terminal 230 in a visible light active region 400 that is lit by at least one of the plurality of cells.

Referring to FIG. 3, the VLC device 220 performs a terminal discovery operation to discover a mobile terminal that enters a cell managed by the VLC device 220, in step 301. Through this discovery operation, the VLC device 220 discovers a mobile terminal that enters a visible light active region, which is lit by a predetermined number of light sources among total light sources managed by the VLC device 220. In step 302, the VLC device 220 determines whether a mobile terminal has been discovered through the discovery operation. If no mobile terminal is discovered, the procedure returns to step 301.

If a mobile terminal is discovered in step 302, the VLC device 220 performs a link negotiation operation by exchanging information to perform VLC with the discovered mobile terminal 230 in step 303. In step 304, the VLC device 220 establishes a communication link to the mobile terminal 230.

When the mobile terminal 230 is located in a visible light active region 400 lit by a cell, as illustrated in FIG. 4, the mobile terminal 230 exchanges data with the VLC device 220 in step 305. However, if the mobile terminal 230 moves in the direction indicated by arrow 410, the mobile terminal 230 moves out of the visible light active region 400. Thereafter, the VLC device 220 will receive an uplink signal from the mobile terminal 230 in a cell other than the visible light active region 400.

Figure 5:
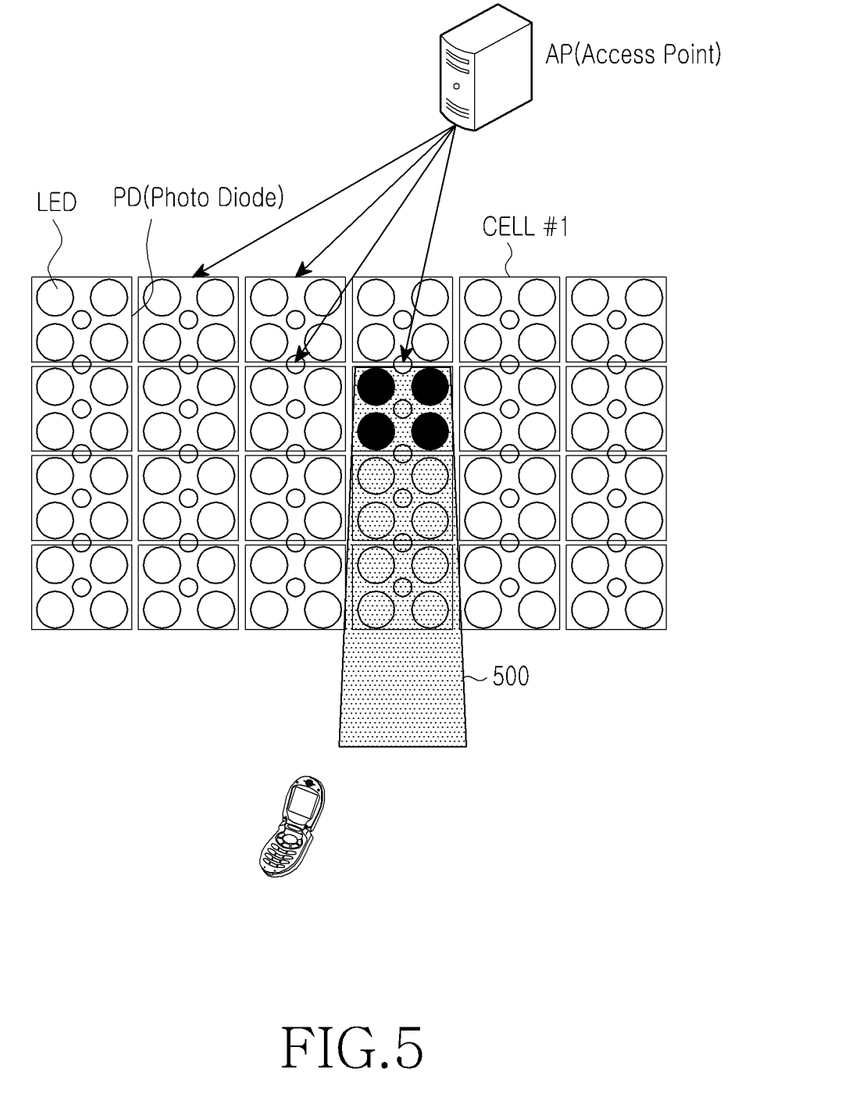

Thus, in step 306, the VLC device 220 determines whether the uplink signal has been received in an active region, and if not, determines whether the uplink signal has been received in a neighboring cell in step 307. If no uplink signal has been received in a neighboring cell in step 307, in step 308, the VLC device 220 determines whether an uplink signal in the neighboring cell fails to be received more than N times, e.g., if the an uplink signal fails to be received in N neighbor cells, and if the uplink signal fails to be received less than the N times, in step 309, the VLC device 220 changes terminal discovery cell to a new neighboring cell. That is, a visible light active region 500 is changed while changing a cell, as illustrated in FIG. 5. More specifically, in step 309, the VLC device 220 sets a cell to be activated, by considering the mobility of the mobile terminal 230 based on the received uplink signal. That is, the cell for searching the uplink signal is changed to the new neighboring cell.

Figure 7:
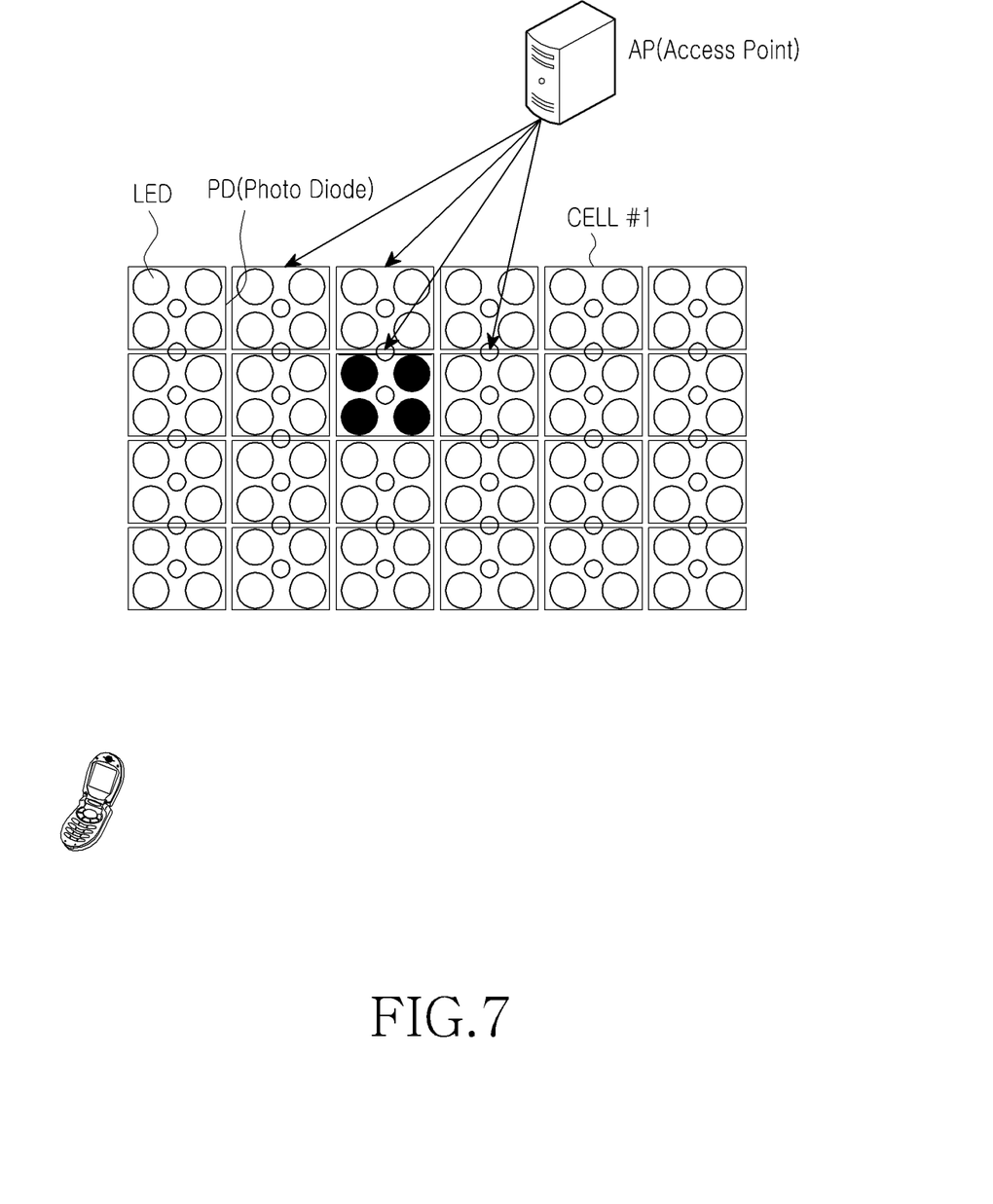

If the uplink signal fails to be received through neighboring cells within the N attempts in step 308, the VLC device 220 performs terminal discovery again in step 301. That is, if the number of failures for an uplink signal to be received in the neighbor cells is N, the VLC device 220 determines that the mobile terminal 230 has moved out of a region managed by the VLC device 220, as illustrated in FIG. 7, and the procedure returns to step 301 to repeat the discovery operation for discovering another terminal.

Figure 6:
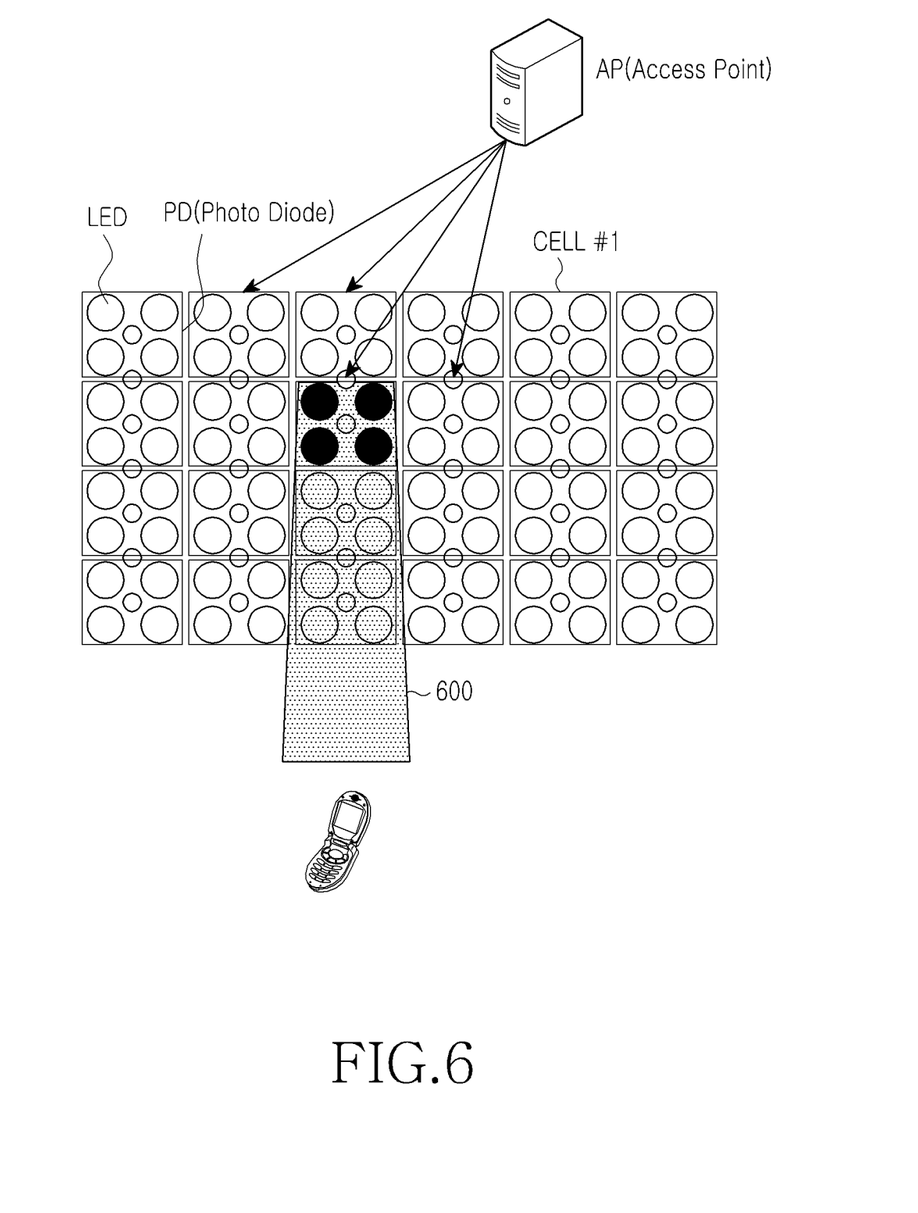

Upon receiving the uplink signal in a neighboring cell in step 307, as illustrated in FIG. 6, the VLC device 220 changes a visible light active region based on the location at which the uplink signal has been received in step 310, i.e., to the neighboring cell. After changing the visible light active region, the VLC device 220 transmits a beacon signal in step 312. Herein, the beacon signal assists in synchronization, link negotiation, and link connection between an AP and the mobile terminal 230.

Figure 8:
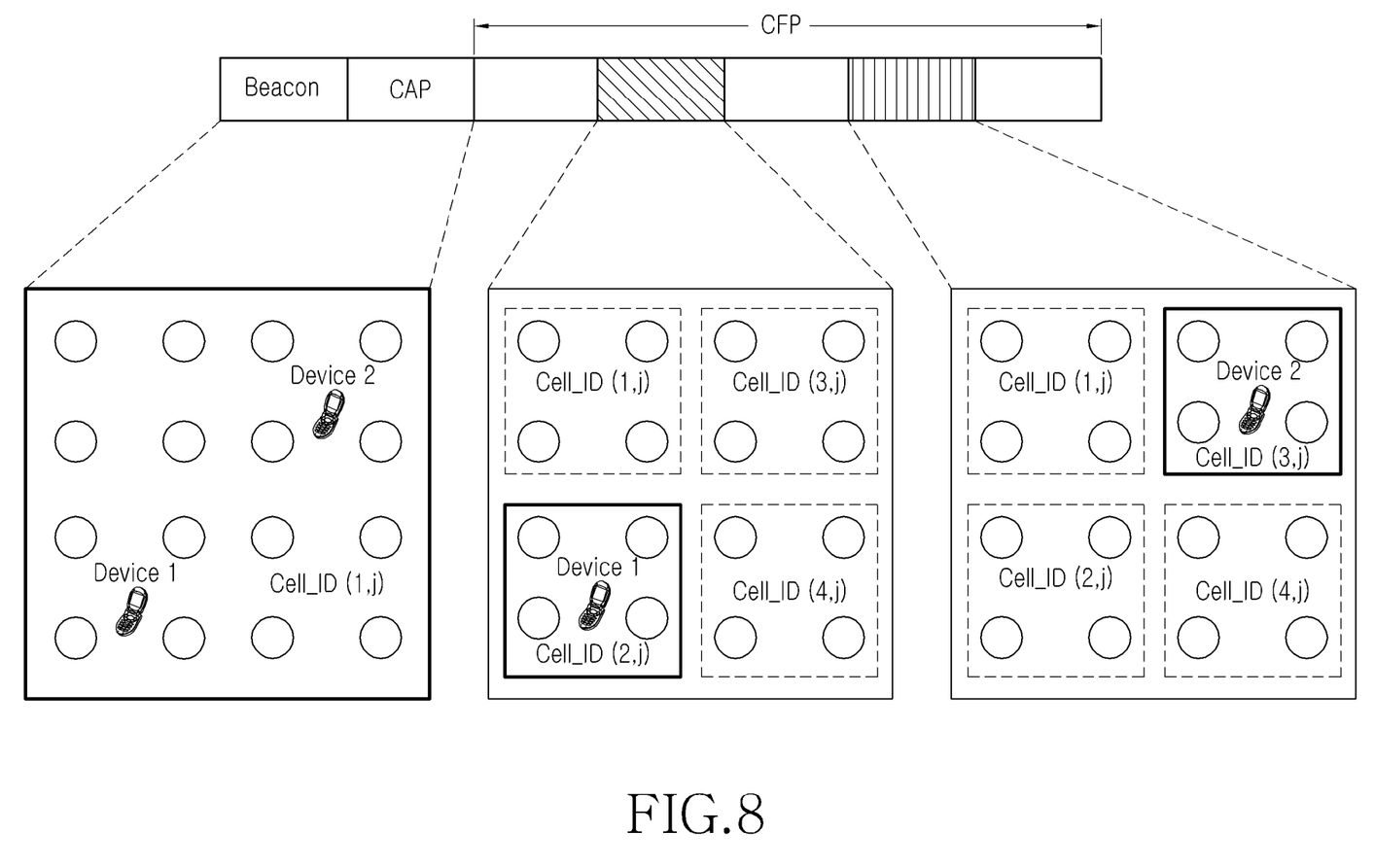
FIG. 8 illustrates a method for resetting a cell according to an embodiment of the present invention.

In step 313, the VLC device 220, after transmitting the beacon signal, determines whether there is a new user in another cell, and if so, in step 314, resets the cell based on the cell including the new user and the visible light active region changed in step 310, as illustrated in FIG. 8.

FIG. 8 illustrates a method for resetting a cell according to an embodiment of the present invention.

Referring to FIG. 8, if it is determined that there are a first mobile terminal and a second mobile terminal among all of the light sources, among four cells, each including a predetermined number of light sources, a left bottom cell is set as a cell for the first mobile terminal and a right top cell is set as a cell for the second mobile terminal.

Returning to FIG. 3, if there is no new user in another cell, in step 315, the VLC device 220 resets the cell based on the visible light active region changed in step 310. Unless connection is terminated in step 316, the procedure returns to step 305 to repeat the foregoing process.

Additionally, because a collision is more likely to occur if VLC is performed with several mobile terminals located in the existing sector, the VLC device 220 may use a Time Division Multiple Access (TDMA) scheme. Thus, the VLC 220 allocates a time slot to each mobile terminal. Accordingly, even if the mobile terminal 230 moves out of the current cell, another terminal may continue communication in the same cell.

According to an embodiment of the present invention, by activating only necessary light sources for VLC considering the mobility of the mobile terminal, instead of using total light sources for VLC, power consumption can be significantly reduced. Moreover, by continuously determining whether the mobile terminal moves, a seamless data service can be provided.

As can be appreciated from the foregoing description, a seamless continuous communication service of the mobile terminal can be provided and power consumption can be reduced by using only a necessary region, instead of by using all LEDs forming a lighting lamp.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method for supporting, by a coordinator, mobility of a terminal that performs Visible Light Communication (VLC) with the coordinator, the method comprising:

transmitting data to the terminal using at least one light source of a first cell among a plurality of cells;
determining whether a response signal is received from the terminal in the first cell;
searching for the terminal in a neighboring cell of the first cell, if the response signal is not received; and
determining the neighboring cell as a serving cell, if the terminal is located in the neighboring cell.

2. The method of claim 1, further comprising searching for the terminal in the plurality of cells by performing a discovery operation transmitting a beacon signal.

3. The method of claim 1, further comprising:
performing link negotiation and link connection with the terminal, after locating the terminal.

4. The method of claim 1, wherein each of the plurality of cells is capable of performing visible light communication using a predetermined number of light sources.

5. The method of claim 1, wherein the response signal includes one of an Acknowledgement frame signal and a Color Visible Dimming (CVD) frame.

6. The method of claim 1, further comprising:
counting a number of failures for receiving the response signal, if the terminal is not found in the neighboring cell,; and
changing a search cell to a new neighboring cell and searching for the terminal in the new neighboring cell, if the number of failures exceeds a predetermined threshold.

7. The method of claim 1, further comprising:
locating another terminal other than the terminal; and
setting visible light active regions separately with respect to the terminal and the another terminal.

8. The method of claim 7, further comprising managing the terminal and the another terminal using a Time Division Multiple Access (TDMA) scheme.

9. The method of claim 1, wherein the coordinator comprises an Access Point (AP).

10. The method of claim 1, wherein searching for the terminal in the neighboring cell is performed during a same time slot assigned to the terminal.

11. A coordinator for performing Visible Light Communication (VLC) with a terminal, the coordinator comprising:
a controller for controlling to transmit data to at least one light source of a first cell among the plurality of cells, determining whether a response signal is received from the terminal in the first cell, searching for the terminal in a neighboring cell of the first cell, if the response signal is not received, and determining the neighboring cell as a serving cell, if the terminal is located in the neighboring cell.

12. The coordinator of claim 11, wherein the controller searches for the terminal in the plurality of cells by performing a discovery operation transmitting a beacon signal.

13. The coordinator of claim 12, wherein the controller performs link negotiation and link connection with the terminal, after locating the terminal.

14. The coordinator of claim 11, wherein the response signal comprises one of:
an Acknowledgement frame signal; and
a Color Visible Dimming (CVD) frame.

15. The coordinator of claim 11, wherein the controller counts a number of failures for receiving the response signal, if the terminal is not found in the neighboring cell, and changes a search cell to a new neighboring cell and searches for the terminal in the new neighboring cell, if the counted number of failures exceeds a predetermined threshold.

16. The coordinator of claim 11, wherein the controller locates another terminal other than the terminal, and sets visible light active regions separately with respect to the terminal and the another terminal.

17. The coordinator of claim 16, wherein the controller manages the terminal and the another terminal using a Time Division Multiple Access (TDMA) scheme.

18. The coordinator of claim 11, wherein the coordinator comprises an Access Point (AP).

19. The coordinator of claim 11, the controller searches for the terminal in the neighboring cell of the first cell during a same time slot assigned to the terminal.

20. A method for supporting, by a coordinator, mobility of a terminal in a Visible Light Communication (VLC) system, the method comprising:
transmitting data to the terminal located in a sector including at least one light source;
if a response signal is not received from the terminal in the sector, searching for a sector in which the response signal is received from the terminal; and
if the response signal is successfully received from the searched sector, setting the searched sector in which the response signal is received as a serving sector.

21. The method of claim 20, wherein the response signal received from the terminal is an Acknowledgement (ACK) signal or a Negative ACK (NACK) signal.

22. The method of claim 21, further comprising:
if the ACK signal is not received, counting a number of failures to receive the ACK signal; and
if the number of failures is less than a predetermined number, extending the sector according to the number of failures.

23. The method of claim 22, wherein extending the sector comprises increasing a number of light sources used to transmit data.

24. The method of claim 21, further comprising:
if the NACK signal is not received, counting a number of failures to receive the NACK signal; and
if the number of failures is less than a predetermined number, extending the sector according to the number of failures.

25. The method of claim 21, wherein the NACK signal is received in a sector other than the serving sector.

26. The method of claim 20, wherein setting the sector comprises adjusting the sector into a region of a size that enables the VLC by using a predetermined number of light sources based on an area in which the response signal is received from the terminal.

27. The method of claim 20, wherein a size of the sector changes according to a moving direction and a speed of the terminal.

28. The method of claim 20, wherein the coordinator includes an Access Point (AP).

29. The method of claim 20, wherein searching for the sector is performed during a same time slot assigned to the terminal.

30. A method for supporting, by a coordinator, mobility of a terminal in a Visible Light Communication (VLC) system, the method comprising:
transmitting data to the terminal located in a sector from among a plurality of sectors, the sector and each of the plurality of sectors including a predetermined number of light sources;
determining whether a response signal is received from the terminal in the sector;

searching for at least one sector among the plurality of sectors, if the response signal is not received in the sector;

determining whether the response signal is received from the terminal in the at least one sector; and if the response signal is successfully received in the at least one sector, setting the at least one sector in which the response signal is received as a serving sector.

31. The method of claim 30, wherein the response signal received from the terminal is an Acknowledgement (ACK) signal or a Negative ACK (NACK) signal.

32. The method of claim 30, further comprising:

if the NACK signal is received, determining whether there is an existing sector which is in communication with another terminal based on an area of the sector in which the NACK signal is received; and if there is the existing sector, managing the another terminal and the terminal using a Time Division Multiple Access (TDMA) scheme.

33. The method of claim 30, wherein setting the at least one sector comprises adjusting a size of the set at least one sector based on an area of the at least one sector in which the ACK signal is received.

34. A coordinator for performing Visible Light Communication (VLC) with a terminal, the coordinator comprising:

a controller for controlling to transmit data to at least one light source in a sector, searching for a sector in which the response signal is received from the terminal, if the response signal is not received from the terminal in the sector, and setting the searched sector in which the response signal is received as a serving sector.

35. The coordinator of claim 34, wherein the response signal is an Acknowledgement (ACK) signal or a Negative ACK (NACK) signal.

36. The coordinator of claim 35, wherein the controller counts a number of failures to receive the ACK signal, and extends the sector according to the number of failures, if the number of failures is less than a predetermined number.

37. The coordinator of claim 34, wherein the controller sets the sector by adjusting the set sector into a region of a size that enables the VLC by using a predetermined number of light sources based on an area in which the response signal is received from the terminal.

38. The coordinator of claim 34, wherein a size of the set sector changes according to a moving direction and a speed of the terminal.

39. The coordinator of claim 34, wherein the terminal comprises:

a receiver for receiving the data from the coordinator using a visible light signal;

a transmitter for transmitting transmission data as a visible light signal; and a controller for, upon receiving the data from the coordinator, transmitting an Acknowledgement (ACK) signal indicating a success in receiving the data, and upon failing to receive the data from the coordinator, transmitting a Negative ACK (NACK) signal indicating a failure to receive the data.

40. The coordinator of claim 34, wherein each of the sectors includes a predetermined number light sources, and wherein the controller searches for the sector by activating and deactivating a predetermined number of the sectors.

41. The coordinator of claim 34, the controller searches for the sector during a same time slot assigned to the terminal.

* * * * *